US012100582B2

(12) United States Patent
Nishiguchi

(10) Patent No.: US 12,100,582 B2
(45) Date of Patent: Sep. 24, 2024

(54) ION ANALYZER

(71) Applicant: SHIMADZU CORPORATION, Kyoto (JP)

(72) Inventor: Masaru Nishiguchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 338 days.

(21) Appl. No.: 17/839,590

(22) Filed: Jun. 14, 2022

(65) Prior Publication Data

US 2023/0059144 A1 Feb. 23, 2023

(30) Foreign Application Priority Data

Aug. 19, 2021 (JP) ................................ 2021-133743

(51) Int. Cl.
*H01J 49/06* (2006.01)
*H01J 49/02* (2006.01)

(52) U.S. Cl.
CPC .......... *H01J 49/063* (2013.01); *H01J 49/022* (2013.01)

(58) Field of Classification Search
CPC .............................. H01J 49/063; H01J 49/022
See application file for complete search history.

(56) References Cited

U.S. PATENT DOCUMENTS

2011/0012017 A1 1/2011 Nishiguchi
2013/0313421 A1 11/2013 Taniguchi
2017/0301532 A1* 10/2017 Taniguchi ............. H01J 49/424
2021/0296108 A1 9/2021 Tateishi et al.
2021/0407784 A1* 12/2021 Chen ..................... H01J 49/005

FOREIGN PATENT DOCUMENTS

JP 2013-247000 A 12/2013
JP 2015-507334 A 3/2015
WO 2009/110025 A1 9/2009
WO 2013/114196 A1 8/2013
WO 2018/069982 A1 4/2018

OTHER PUBLICATIONS

Japanese Office Action issued May 14, 2024 in Application No. 2021-133743.

* cited by examiner

*Primary Examiner* — Nicole M Ippolito
(74) *Attorney, Agent, or Firm* — Sughrue Mion, PLLC

(57) ABSTRACT

An ion analyzer includes an ion optical element having four rod electrodes around an optical axis, for transferring ions from their surrounding space to the subsequent stage while converging the ions. To create an RF electric field within this space, a voltage supplier applies RF voltages of opposite polarities to two pairs of electrodes facing each other across the axis. The cross-sectional shape of each electrode in a plane orthogonal to the axis has a first side having width w facing the axis and is tangent to a circle of radius $r_0$ around the axis, and two adjacent sides connected to the ends of the first side at an angle determined so that an RF field created by the adjacent sides exerts no influence within the space. The ratio $w/r_0$ is determined so that the amount of dodecapole field component becomes a predetermined value or does not exceed it.

10 Claims, 3 Drawing Sheets

| | RECTANGULAR | CHAMFERED |
|---|---|---|
| OPTIMIZATION PARAMETER | $w/r_0 = 0.8233$ | $c/r_0 = 0.6637$ |
| QUADRUPOLE FIELD | 1.032 | 1.028 |
| DODECAPOLE FIELD | 5.328E-13 | 5.113E-17 |
| 20-POLE FIELD | -3.731E-02 | -2.585E-02 |

ION ANALYZER

TECHNICAL FIELD

The present invention relates to an ion analyzer including a mass spectrometer or ion mobility spectrometer.

BACKGROUND ART

A mass spectrometer which uses an atmospheric pressure ion source normally employs the configuration of a multi-stage differential pumping system in which two or more intermediate vacuum chambers are located between an ionization chamber, which contains the atmospheric pressure ion source under substantially atmospheric pressure, and an analysis chamber, which contains a mass separator and an ion detector in a high vacuum state. In this type amass spectrometer, an ion guide, which is a kind of ion optical element, is used in each intermediate vacuum chamber in order to efficiently collect ions and send them to the next stage.

An RF ion guide, which captures and transports ions by an effect of a radio-frequency (RF) electric field, is normally used in an intermediate vacuum chamber with a low-vacuum gas pressure of approximately 100 Pa, or in an intermediate vacuum chamber with a medium-vacuum gas pressure of approximately 1 Pa (for example, see Patent Literature 1). A typical RF ion guide is a quadrupole ion guide with four rod electrodes arranged around an ion optical axis. Although quadrupole ion guides are less capable of confining ions than octapole ion guides, they are characterized in that ions are more likely to be converged into an area near the ion optical axis since the bottom of the potential well which is formed within the ion-passage space is limited to a radially small region near the ion optical axis.

CITATION LIST

Patent Literature

Patent Literature 1: JP 2013-247000 A
Patent Literature 2: WO 2009/110025 A
Patent Literature 3: WO 2018/069982 A

SUMMARY OF INVENTION

Technical Problem

In many cases, the rod electrodes forming a quadrupole ion guide have a cylindrically worked circumferential surface. More specifically, each electrode is worked so that its cross section in a plane orthogonal to the ion optical axis is arc-shaped in a portion facing the ion optical axis. This is intended to make the RF electric field within the ion-passage space as close to the ideal quadrupole field as possible. However, the process of precisely working the circumferential surface into a cylindrical form is technically difficult and incurs a considerable amount of cost, thereby constituting a factor that prevents the cost reduction of the entire system.

The previously described problem is not limited to an ion guide for transporting ions but similarly applies to a quadrupole mass filter used as a mass separator.

The present invention has been developed in view of such a problem. Its primary objective is to provide an ion analyzer for which the electrodes for constructing a quadrupole ion guide or quadrupole mass filter can be more easily manufactured and thereby allow for a reduction in cost.

Solution to Problem

One mode of the ion analyzer according to the present invention developed for solving the previously described problem includes:

an ion optical element including four rod electrodes arranged around an ion optical axis, each of the rod electrodes extending in the direction of the ion optical axis, and configured to send, to the subsequent stage, at least a portion of the ions introduced into a space surrounded by the four rod electrodes while converging the ions; and a voltage supplier configured to apply two RF voltages of opposite polarities to two pairs of rod electrodes among the four rod electrodes, respectively, so as to create an RF electric field within the space, where each of the two pairs of rod electrodes face each other across the ion optical axis, where:

the cross-sectional shape of each of the four rod electrodes in a plane orthogonal to the ion optical axis has a first side which is a side facing the ion optical axis and is a portion of a tangent to a circle centered at the ion optical axis, as well as a second side and a third side respectively connected to the two ends of the first side at a predetermined angle which is determined so that an RF electric field created by the second side and the third side exerts no influence within the space; and the ratio $w/r_0$ between the radius $r_0$ of the circle and the width w of the first side is determined so that the amount of dodecapole field component in the RF electric field created within the space is equal to or lower than a predetermined value or equal to a specific value.

Another mode of the ion analyzer according to the present invention developed for solving the previously described problem includes:

an ion optical element including four rod electrodes arranged around an ion optical axis, each of the rod electrodes extending in the direction of the ion optical axis, and configured to send, to the subsequent stage, at least a portion of the ions introduced into a space surrounded by the four rod electrodes while converging the ions; and a voltage supplier configured to apply two RF voltages of opposite polarities to two pairs of rod electrodes among the four rod electrodes, respectively, so as to create an RF electric field within the space, where each of the two pairs of rod electrodes face each other across the ion optical axis, where:

the cross-sectional shape of each of the four rod electrodes in a plane orthogonal to the ion optical axis is a half-rectangular shape in which the corner portions at both ends of a first side which is a side facing the ion optical axis and is a portion of a tangent to a circle centered at the ion optical axis are each chamfered; and the ratio $c/r_0$ between the radius $r_0$ of the circle and the dimension c of the chamfering as well as the width w of the first side are determined so that the amount of dodecapole field component in the RF electric field created within the space is equal to or lower than a predetermined value or equal to a specific value.

Advantageous Effects of Invention

In the ion analyzer according to any of the previously described modes of the present invention, each of the rod electrodes forming a quadrupole ion guide, quadrupole mass filter or similar ion optical element has a geometric figure consisting of a combination of flat planes. This lowers the degree of difficulty in manufacturing and reduces the cost of the aforementioned type of ion optical element as compared to the conventional rod electrodes whose circumferential surface is cylindrical. Consequently, the production cost of the ion analyzer will also be suppressed.

DESCRIPTION OF EMBODIMENTS

In the two previously described modes of the ion analyzer according to the present invention, the four rod electrodes may typically be arranged at regular intervals of angle around the ion optical axis, i.e., at angular intervals of 90 degrees.

Each rod electrode may be a single rod electrode extending parallel to the ion optical axis, or it may be a segmented structure consisting of a plurality of segments arranged along the ion optical axis.

The previously described modes of the ion analyzer according to the present invention typically include a mass spectrometer and an ion mobility spectrometer, as well as an ion-mobility mass spectrometer which has both an ion mobility separation section and a mass separation section combined together.

In the previously described modes of the ion analyzer according to the present invention, the ion optical element includes an ion guide configured to simply transport ions to the subsequent stage while converging them, and a quadrupole mass filter having the function of selectively allowing an ion having a predetermined mass-to-charge ratio (strictly speaking, this should be noted as m/z in italic font, although the term "mass-to-charge ratio" or "m/z" is used in the present description) or ions falling within a predetermined mass-to-charge-ratio range to pass through while dispersing other ions.

A mass spectrometer as one embodiment of the ion analyzer according to the present invention is hereinafter described with reference to the attached drawings.

Figure 1:
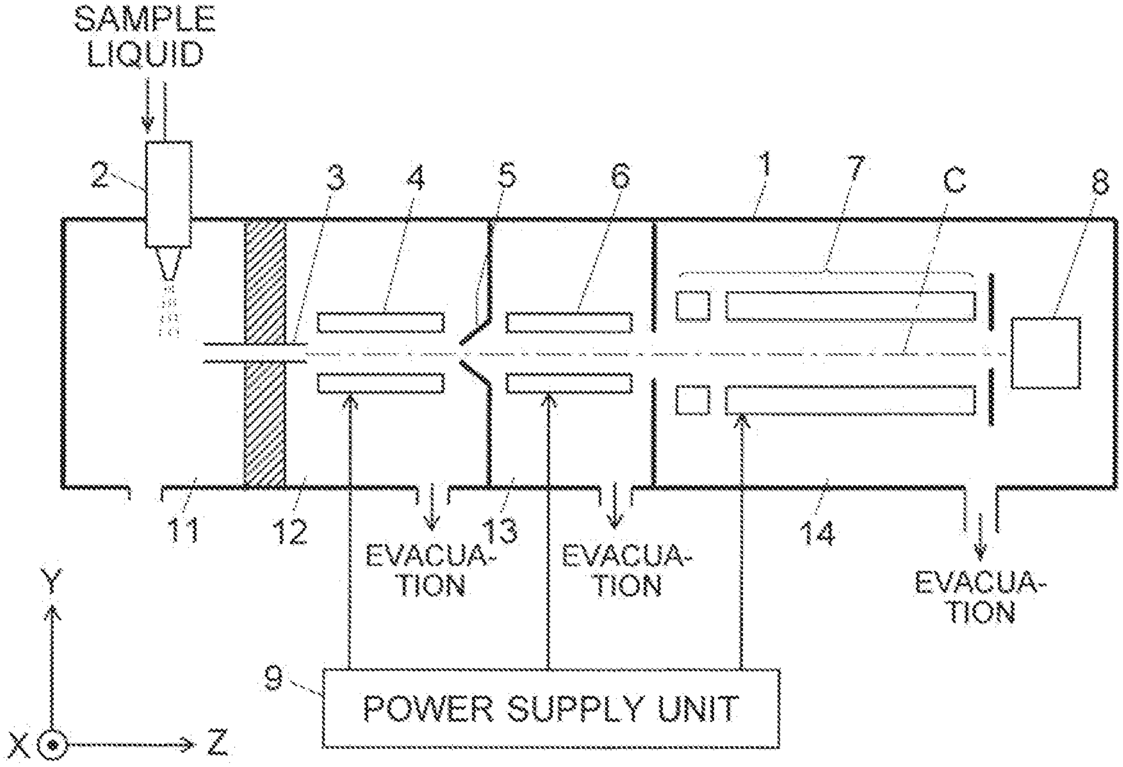
FIG. 1 is an overall configuration diagram of a mass spectrometer as one embodiment of the present invention.

FIG. 1 is an overall configuration diagram of a mass spectrometer according to the present embodiment. This mass spectrometer is a single type of quadrupole mass spectrometer including an atmospheric pressure ion source. For convenience of explanation, three axes of X, Y and Z which are orthogonal to each other are defined within the space, as shown in FIG. 1.

The mass spectrometer according to the present embodiment includes a chamber 1 which is divided into four sections: an ionization chamber 11, first intermediate vacuum chamber 12, second intermediate vacuum chamber 13 and analysis chamber 14. The ionization chamber 11 is at substantially atmospheric pressure, while the first intermediate vacuum chamber 12, second intermediate vacuum chamber 13 and analysis chamber 14 are individually evacuated by vacuum pumps (not shown). This mass spectrometer has the configuration of a multi-stage differential pumping system with the degree of vacuum sequentially increased from the ionization chamber 11 through the first and second intermediate vacuum chambers 12 and 13 to the analysis chamber 14. For example, the gas pressure may be approximately 100 Pa in the first intermediate vacuum chamber 12, approximately 1 Pa in the second intermediate vacuum chamber 13, and $10^{-2}$ to $10^{-4}$ Pa in the analysis chamber 14.

The ionization chamber 11 is provided with an electrospray ionization (EST) probe 2 as an ion source. The ESI probe 2 sprays a sample liquid into the ionization chamber 11 in the form of electrically charged droplets, to thereby ionize various components contained in the sample liquid. The ionization chamber 11 communicates with the first intermediate vacuum chamber 12 through a thin desolvation tube 3. The ions generated within the ionization chamber 11 are drawn into the desolvation tube 3 by being carried by a flow of gas formed by the pressure difference between the two ends of the desolvation tube 3. The solvation tube 3 is heated to a predetermined temperature. When charged droplets from which the solvent has not been sufficiently vaporized are drawn into the desolvation tube 3, the vaporization of the solvent from those droplets is promoted during their travel through the desolvation tube 3, and ions are generated.

The first and second intermediate vacuum chambers 12 and 13 contain ion guides 4 and 6, respectively. Predetermined voltages are applied from a power supply unit 9 to the plurality of electrodes forming the ion guides 4 and 6, respectively. Due to those voltages, an electric field for transporting ions while converging them is created within the space surrounded by the plurality of electrodes. The ions which have originated from sample components and introduced into the first intermediate vacuum chamber 12 are converged by the ion guide 4 and sent into the second intermediate vacuum chamber 13 through the small hole formed at the apex of a skimmer 5. The ions introduced into the second intermediate vacuum chamber 13 are converged by the ion guide 6 and sent into the analysis chamber 14.

In the analysis chamber 14, a quadrupole mass filter 7 and an ion detector 8 are arranged along the ion optical axis C. In the present example, the quadrupole mass filter 7 includes main rod electrodes as well as pre-rod electrodes and post-rod electrodes located before and after the main rod electrodes, respectively. Predetermined voltages are applied from the power supply unit 9 to the plurality of rod electrodes forming the quadrupole mass filter 7, whereby an electric field is created which selectively allows an ion having a predetermined mass-to-charge ratio (or ions falling within a predetermined mass-to-charge-ratio range) to pass through while dispersing other ions. Among the various ions introduced into the analysis chamber 14, for example, only an ion having a specific mass-to-charge ratio is allowed to pass through the quadrupole mass filter 7 and reach the ion detector 8.

The ion detector 8 produces an ion intensity signal according to the amount of ions it has received. The ion intensity signal is sent to a data processor (not shown), in which a data processing operation is performed. For example, a voltage applied to the electrodes forming the quadrupole mass filter 7 may be varied to scan a predetermined range of voltages, in which case the mass-to-charge ratio of the ion which is allowed to pass through the quadrupole mass filter 7 varies accordingly, and the data processor can create a mass spectrum showing a change in the ion intensity over a predetermined mass-to-charge-ratio range.

Figure 2:
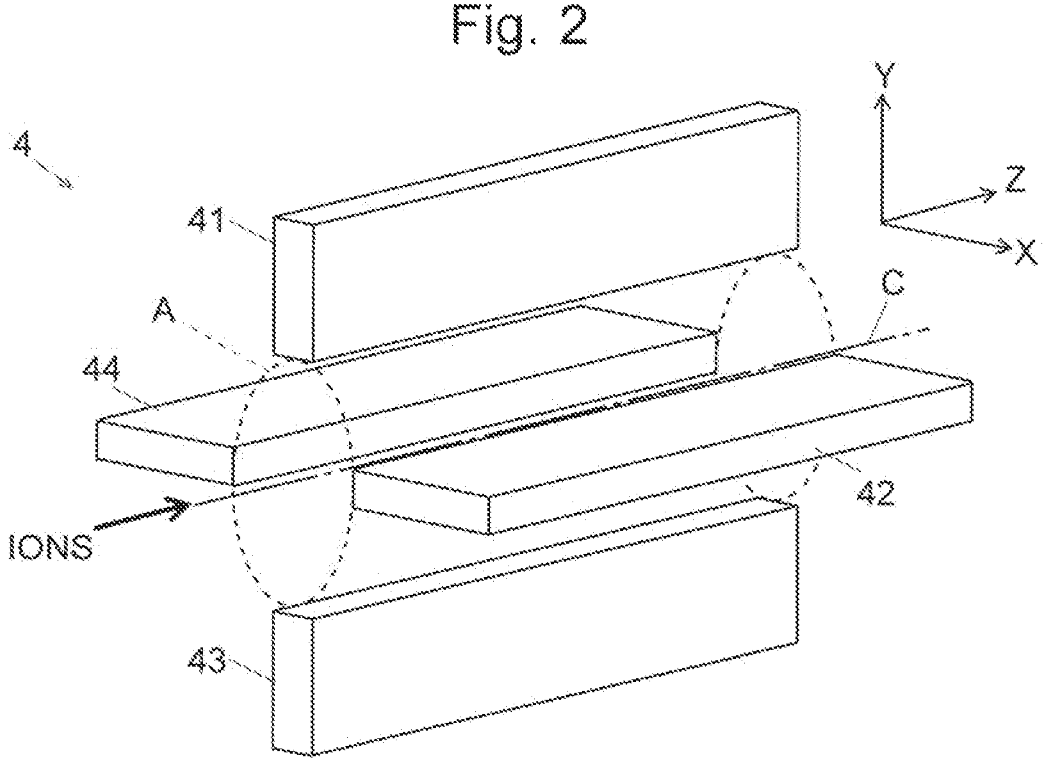
FIG. 2 is a schematic perspective view of an electrode unit of an ion guide in the mass spectrometer according to the present embodiment.
Figure 3:
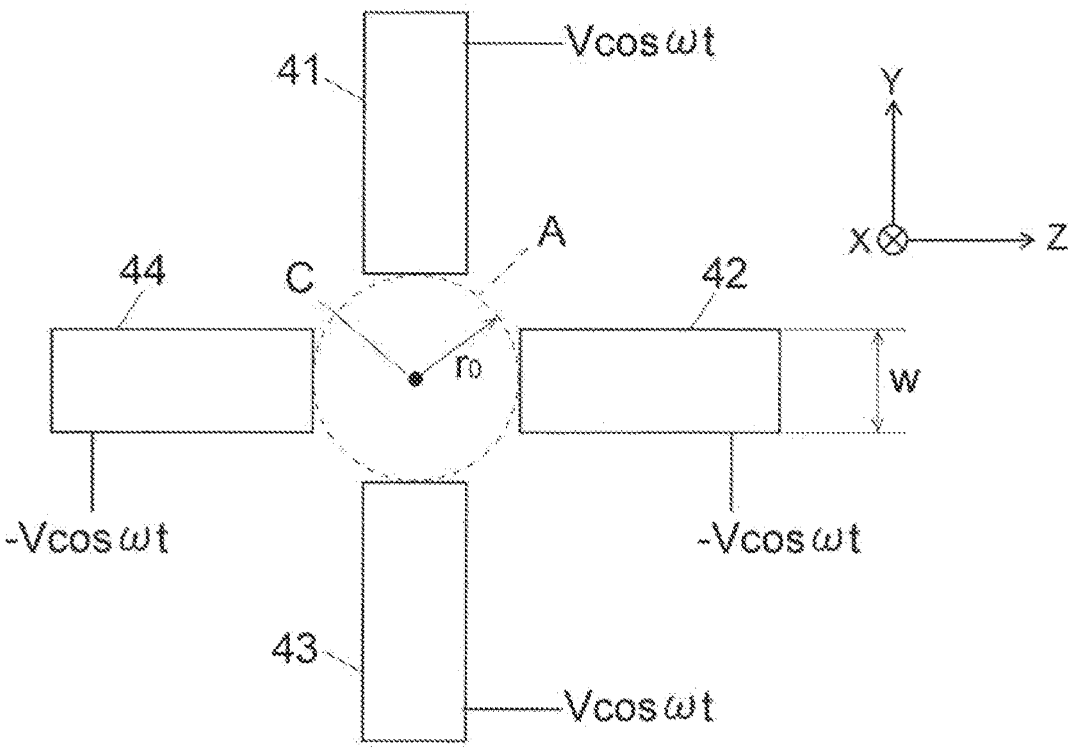
FIG. 3 is a sectional view at a plane orthogonal to the ion optical axis C of the ion-guide electrode unit shown in FIG. 2.

FIG. 2 is a schematic perspective view showing the electrode structure of the ion guide 4 in the mass spectrometer according to the present embodiment. FIG. 3 is a cross-sectional view of the ion guide 4 at a plane (X-Y plane) orthogonal to the ion optical axis C.

This ion guide 4 is a quadrupole ion guide in which four rod electrodes 41, 42, 43 and 43 are arranged around the ion optical axis C as well as parallel to the same axis C. It should be noted that each of the rod electrodes 41-44 used in the present example has a rectangular cross-sectional shape (note: any "cross section" in the following descriptions is a section in the X-Y plane orthogonal to the ion optical axis C), unlike the rod electrodes in a commonly known quadrupole ion guide in which each rod electrode has a cylindrical shape in its entire circumferential surface or has a cross section which is arc-shaped at least in a portion facing the ion optical axis C.

That is to say, the ion guide 4 has four rod electrodes 41-44 arranged in a rotationally symmetrical form around the ion optical axis C at angular intervals of 90 degrees, with each rod electrode having a rectangular parallelepiped shape elongated in the direction of the ion optical axis C (Z-axis direction). Each of the rod electrodes 41-44 has a half-rectangular cross-sectional shape in the portion facing the ion optical axis C. Those portions of the rod electrodes 41-44 are circumscribed to circle A of radius $r_0$. In other words, the shortest distance between each rod electrode 41-44 and the ion optical axis C is $r_0$. The length of the side facing the ion optical axis C in the cross section of each rod electrode 41-44 (first side), i.e., the width of each rod electrode 41-44 as viewed from the ion optical axis C, is w. The length of the sides perpendicular to the width w of the first side in the cross section of each rod electrode 41-44 (the second and third sides), i.e., the length in the radial direction, may be appropriately determined, provided that there is no influence on the electric field created by the voltages applied to the rod electrodes 41-44 within the space surrounded by the rod electrodes 41-44.

As shown in FIG. 3, the two rod electrodes 41 and 43 facing each other across the ion optical axis C are supplied with a predetermined RF voltage (Vcosωt) from the power supply unit 9, while the other two rod electrodes 42 and 44 are supplied with an RF voltage with the opposite polarity (−Vcosωt) from the power supply unit 9. It should be noted that a predetermined DC bias voltage may optionally be added to the RF voltages applied to the rod electrodes 41-44. The voltages thus applied are essentially identical to those applied in conventional quadrupole ion guides.

It has been commonly known that applying voltages to the rod electrodes in a quadrupole ion guide creates not only a quadrupole field but also higher-order multipole fields whose numbers of poles are expressed by 4×(2n−1), where n is an integer equal to or greater than two, such as a 12-pole (dodecapole) or 20-pole field. This fact also applies to quadrupole mass filters.

In the case of a quadrupole ion guide in which rod electrodes having a cylindrical circumferential surface are used, the amount of resultant dodecapole field, which makes the most significant influence on the behavior of the ions among the higher-order multipole fields, is normally controlled by adjusting the ratio between the radius of the circle inscribed to the four rod electrodes (a circle which corresponds to circle A in FIG. 3) and that of the rod electrodes. However, in that case, as explained earlier, the cross-sectional shape of each rod electrode must be circular with a high level of precision. This requires a high level of accuracy for the machining of the rod electrodes, with a corresponding increase in the manufacturing cost. To deal with this problem, the present inventor has repeated elaborate calculations and discovered the fact that the amount of resultant dodecapole field can be controlled through the dimensions related to the rod electrodes themselves and their arrangement even when the rod electrodes have a rectangular cross-sectional shape, or a chamfered cross-sectional shape as will be described later.

It is commonly known that the potential formed within an inner space in an ion guide having a multipole structure can be expressed by the following multipole expansion (for example, see Patent Literature 2 or 3):

$$\Phi(r,\theta)=\Sigma K_n(r/r_0)^n \cos[n(\theta-\theta_0)] \quad (1)$$

where n is a positive integer representing the order of the multipole field, Σ is the summation for n, $K_n$ is an expansion coefficient representing the magnitude of the 2n-pole field component, r is the radial position within the space surrounded by the rod electrodes, θ is the angle in the polar coordinate system, and $\theta_0$ is the initial phase.

In many cases, it is ideal that only the term of expansion coefficient $K_2$ should occur in equation (1). However, when the rod electrodes are shaped as shown in FIG. 3, higher-order multipole field components of characteristic orders, i.e., 4×(2m−1), also occur, such as the 12-pole (dodecapole) and 20-pole components. The 20-pole field component is practically insignificant. Accordingly, it is the dodecapole field component that needs to be considered.

Figures 5, 6:
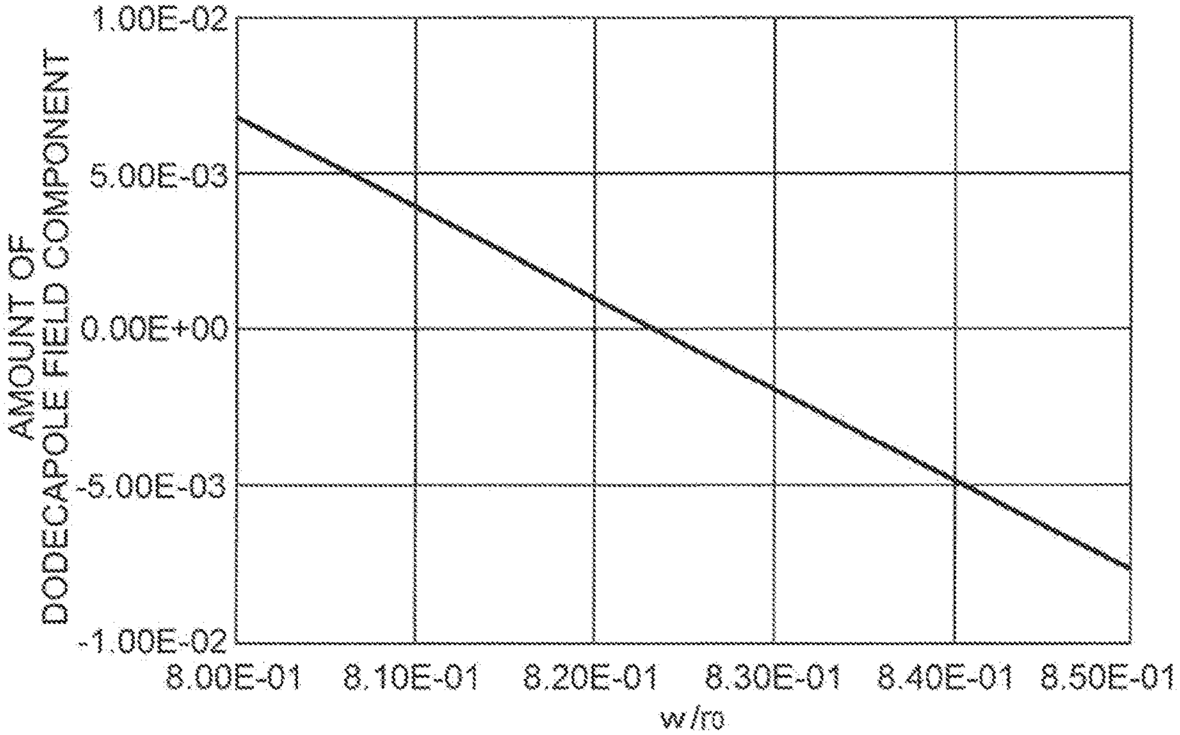
FIG. 5 is a graph showing a calculated result of the relationship between $w/r_0$ and the amount of dodecapole field component in the ion-guide electrode unit shown in FIG. 3.
FIG. 6 is a table showing optimization parameters in the electrode shapes shown in FIGS. 3 and 4, as well as a calculated result of the multipole fields.

Calculating the expansion coefficient $K_6$, which corresponds to the dodecapole field component in equation (1), for various values of the ratio $w/r_0$ of the width w of the rod electrodes 41-44 to radius $r_0$ gives a relationship as shown in FIG. 5. The vertical axis in FIG. 5 corresponds to the expansion coefficient $K_6$. As can be seen in FIG. 5, the amount of dodecapole field component changes between positive and negative values across the level of zero. As a rule of thumb, the value of $w/r_0$ should be set within a range from 0.806 to 0.840 in order to suppress the amount of resultant dodecapole field component to less than 1% of the quadrupole field component. Since the threshold value of 1 is not a strict requirement, it is possible to consider that setting the value of $w/r_0$ within a slightly broader range, e.g., from 0.8 to 0.85, will satisfactorily suppress the amount of resultant dodecapole field component.

Thus, although the rod electrodes having a rectangular cross-sectional shape in the previous described manner give rise to a comparatively large amount of dodecapole field component which causes unfavorable behaviors of ions in addition to the intended quadrupole field, the amount of resultant dodecapole field component can be suppressed to a practically insignificant level by appropriately designing the cross-sectional shape of the rod electrodes, or more specifically, by appropriately setting the value of $w/r_0$. Accordingly, it is possible to achieve a high level of ion transmittance and ensure a sufficient level of analysis sensitivity even when the previously described ion guide 4 is used in place of a common type of quadrupole ion guide which employs rod electrodes having a cylindrical circumferential surface.

In the mass spectrometer according to the present embodiment, not only the ion guide 4 in the first intermediate vacuum chamber 12 but also the ion guide 6 in the second intermediate vacuum chamber 13 can be similarly constructed. Furthermore, not only the ion guides but also the quadrupole mass filter 7 in the analysis chamber 14 can be similarly constructed.

Figure 4:
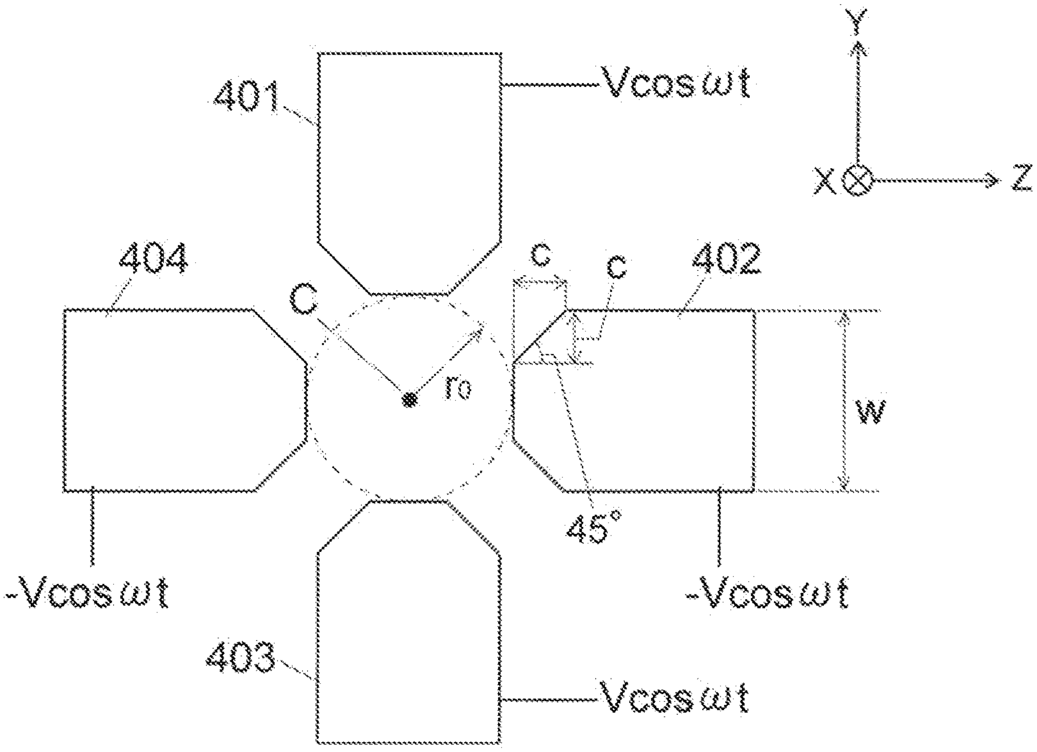
FIG. 4 is a sectional view at a plane orthogonal to the ion optical axis C of the ion-guide electrode unit in a mass spectrometer as a modified example.

In the mass spectrometer according to the previous embodiment, each of the rod electrodes 41-44 has a rectangular cross-sectional shape (i.e., the portion facing the ion optical axis has a half-rectangular shape). FIG. 4 shows rod electrodes 401-404 as a modified example, in which the two corners of the half-rectangular portion facing the ion optical axis C are chamfered (with a chamfering angle of 45 degrees). In this configuration, it is the dimension c of the chamfering, rather than the width of the individual rod electrodes 401-404, that affects the occurrence of the multi pole field components. Therefore, provided that the width w of the rod electrodes 401-404 is fixed at a predetermined value, the ratio $c/r_0$ of dimension c of the chamfering to radius $r_0$ of circle A will show a specific relationship with the expansion coefficient $K_6$, like the one in FIG. 5. Accordingly, as in the previous embodiment, the amount of resultant dodecapole field component can be suppressed to a practically insignificant level by appropriately designing the cross-sectional shape of the rod electrodes 401-404, or more specifically, by appropriately setting the values of w and $c/r_0$.

Generally speaking, it is desirable for an ion guide or quadrupole mass filter to have the highest possible transmittance for target ions, and therefore, the dodecapole field component should preferably be zero, or actually, the closer to zero, the better. Accordingly, for each of the configurations shown in FIGS. 3 and 4, the related parameters should be optimized so that the amount of dodecapole field component will be as close to zero as possible. FIG. 6 shows an example of the optimized parameters and the amounts of multipole field components. It should be noted that the electrode width w of 5 mm in the "Chamfered" case is a mere example.

As shown in FIG. 6, it is possible to suppress the dodecapole field component to approximately zero in both configurations. Although the amount of multipole field component that is higher-order (20-pole) than the dodecapole field component is larger than in the case of the conventional rod electrodes having a cylindrical circumferential surface, this is practically insignificant when the present device is used as an ion guide. However, when the device is used as a quadrupole mass filter, the multipole field component that is higher-order than the dodecapole field component possibly causes some problems, in which case it may be preferable to strike a balance between the higher-order multipole field component and the dodecapole field component.

In the example of FIG. 3, the angle formed by the first side facing the ion optical axis C and each of the two adjacent (second and third) sides, as viewed on the cross section of each rod electrode 41-44, is 90 degrees. This angle may be smaller than 90 degrees. The angle of 45 degrees is selected in the example of FIG. 4. In this case of 45 degrees, the potential on the second and third sides makes a certain influence on the RF electric field created within the space surrounded by the rod electrodes. By comparison, when the angle between the first side and each of the two adjacent (second and third) sides is rather close to 90 degrees within the range from 45 to 90 degrees, the potential on the second and third sides makes no substantial influence on the RF electric field created within the space surrounded by the rod electrodes. For example, when this angle is approximately equal to or greater than 60 degrees, the potential on the second and third sides makes no practical influence on the RF electric field created within the space surrounded by the rod electrodes, so that the amount of resultant dodecapole field component can be controlled by setting an appropriate value of $w/r_0$, as in the example of FIG. 3.

As is evident from the previous description, it is also easy to determine the dimensions of the rod electrodes 41-44 or 401-404 so that the amount of dodecapole field component will be a predetermined target value that is not zero. For example, as described in Patent Literature 3, a specific higher-order multipole field can be superposed on the quadrupole field to exclude, by resonance, an ion having a specific mass-to-charge ratio or ions falling within a predetermined mass-to-charge-ratio range. The technique in the present invention is also available for giving rise to the dodecapole field component with a predetermined magnitude to meet such requirements on performance.

The previous embodiment is a mere example of the present invention, and any change, modification or addition appropriately made within the gist of the present invention will naturally fall within the scope of claims of the present application.

For example, although the previous embodiment is a single type of quadrupole mass spectrometer, the present invention is generally applicable in any type of mass spectrometer including a quadrupole ion guide and/or quadrupole mass filter.

[Various Modes]

A person skilled in the art can understand that the previously described illustrative embodiment and modified example are specific examples of the following modes of the present invention.

(Clause 1) One mode of the ion analyzer according to the present invention includes:

an ion optical element including four rod electrodes arranged around an ion optical axis, each of the rod electrodes extending in the direction of the ion optical axis, and configured to send, to the subsequent stage, at least a portion of the ions introduced into a space surrounded by the four rod electrodes while converging the ions; and a voltage supplier configured to apply two RF voltages of opposite polarities to two pairs of rod electrodes among the four rod electrodes, respectively, so as to create an RF electric field within the space, where each of the two pairs of rod electrodes face each other across the ion optical axis, where:

the cross-sectional shape of each of the four rod electrodes in a plane orthogonal to the ion optical axis has a first side which is a side facing the ion optical axis and is a portion of a tangent to a circle centered at the ion optical axis, as well as a second side and a third side respectively connected to the two ends of the first side at a predetermined angle which is determined so that an RF electric field created by the second side and the third side exerts no influence within the space; and the ratio $w/r_0$ between the radius $r_0$ of the circle and the width w of the first side is determined so that the amount of dodecapole field component in the RF electric field created within the space is equal to or lower than a predetermined value or equal to a specific value.

(Clause 4) Another mode of the ion analyzer according to the present invention includes:

an ion optical element including four rod electrodes arranged around an ion optical axis, each of the rod electrodes extending in the direction of the ion optical axis, and configured to send, to the subsequent stage, at least a portion of the ions introduced into a space surrounded by the four rod electrodes while converging the ions; and a voltage supplier configured to apply two RF voltages of opposite polarities to two pairs of rod electrodes among the four rod electrodes, respectively, so as to create an RF electric field within the space, where each of the two pairs of rod electrodes face each other across the ion optical axis, where:

the cross-sectional shape of each of the four rod electrodes in a plane orthogonal to the ion optical axis is a half-rectangular shape in which the corner portions at both ends of a first side which is a side facing the ion optical axis and is a portion of a tangent to a circle centered at the ion optical axis are each chamfered; and the ratio $c/r_0$ between the radius $r_0$ of the circle and the dimension c of the chamfering as well as the width w of the first side are determined so that the amount of dodecapole field component in the RF electric field created within the space is equal to or lower than a predetermined value or equal to a specific value.

In the ion analyzer described in Clause 1 or 4, each of the rod electrodes forming a quadrupole ion guide, quadrupole mass filter or similar ion optical element has a geometry consisting of a combination of flat planes rather than curved surfaces. This lowers the degree of difficulty in manufacturing and reduces the cost of the aforementioned type of ion optical element as compared to the conventional rod electrodes whose circumferential surface is cylindrical. Consequently, the production cost of the ion analyzer will also be suppressed.

In the ion analyzer described in Clause 1 or 4, the amount of dodecapole field component can not only be made close to zero but also be controlled to be at a specific value. This makes it easy to obtain an ion optical element which meets a specific requirement on performance.

(Clause 2) In the ion analyzer described in Clause 1, the predetermined angle may be 90 degrees. In other words, the four rod electrodes may have a half-rectangular cross-sectional shape in a plane orthogonal to the ion optical axis.

The ion analyzer described in Clause 2 allows the rod electrodes to have an elongated rectangular parallelepiped shape, which is particularly easy to manufacture.

(Clause 3) In the ion analyzer described in Clause 1 or 2, the ratio $w/r_0$ may be within a range from 0.8 to 0.85.

The ion analyzer described in Clause 3 can suppress the amount of dodecapole field component to a sufficiently low level for practical use and achieve a high level of ion transmittance.

(Clause 5) in the ion analyzer described in one of Clauses 1-4, the ion optical element may be a quadrupole ion guide.

(Clause 6) The ion analyzer described in Clause 5 may have the configuration of a multi-stage differential pumping system including one or more intermediate vacuum chambers located between an ionization chamber containing an atmospheric pressure ion source and an analysis chamber containing a mass separator, with the ion optical element contained in an intermediate vacuum chamber in the stage next to the ionization chamber or in the stage after next.

In the ion analyzed described in Clause 5 or 6, the ions received from the previous stage can be transported to the subsequent stages efficiently, i.e., with an insignificant loss, and be ultimately subjected to the analysis. Consequently, a high level of analysis sensitivity can be achieved.

(Clause 7) In the ion analyzer described in one of Clauses 1-4, the ion optical element may be a quadrupole mass filter.

The ion analyzed described in Clause 7 can allow target ions to pass through with a high level of selectivity. Consequently, a high level of analysis sensitivity can be achieved.

REFERENCE SIGNS LIST

1 . . . Chamber
11 . . . Ionization Chamber
12 . . . First Intermediate Vacuum Chamber
13 . . . Second Intermediate Vacuum Chamber
14 . . . Analysis Chamber
2 . . . ESI Probe
3 . . . Desolvation Tube
4, 6 . . . Ion Guide
41, 42, 43, 44, 401, 402, 403, 404 . . . Rod Electrode
5 . . . Skimmer
7 . . . Quadrupole Mass Filter
8 . . . Ion Detector
9 . . . Power Supply Unit
C . . . Ion Optical Axis

The invention claimed is:

1. An ion analyzer, comprising:

an ion optical element including four rod electrodes arranged around an ion optical axis, each of the rod electrodes extending in a direction of the ion optical axis, and configured to send, to a subsequent stage, at least a portion of ions introduced into a space surrounded by the four rod electrodes while converging the ions; and a voltage supplier configured to apply two RF voltages of opposite polarities to two pairs of rod electrodes among the four rod electrodes, respectively, so as to create an RF electric field within the space, where each of the two pairs of rod electrodes face each other across the ion optical axis, where:

a cross-sectional shape of each of the four rod electrodes in a plane orthogonal to the ion optical axis has a first side which is a side facing the ion optical axis and is a portion of a tangent to a circle centered at the ion optical axis, as well as a second side and a third side respectively connected to two ends of the first side at a predetermined angle which is determined so that an RF electric field created by the second side and the third side exerts no influence within the space; and a ratio $w/r_0$ between a radius $r_0$ of the circle and a width w of the first side is determined so that an amount of dodecapole field component in the RF electric field created within the space is equal to or lower than a predetermined value or equal to a specific value.

2. The ion analyzer according to claim 1, wherein the predetermined angle is 90 degrees.

3. The ion analyzer according to claim 1, wherein the ratio $w/r_0$, is within a range from 0.8 to 0.85.

4. An ion analyzer, comprising:

an ion optical element including four rod electrodes arranged around an ion optical axis, each of the rod electrodes extending in a direction of the ion optical axis, and configured to send, to a subsequent stage, at least a portion of ions introduced into a space surrounded by the four rod electrodes while converging the ions; and a voltage supplier configured to apply two RF voltages of opposite polarities to two pairs of rod electrodes among the four rod electrodes, respectively, so as to create an RF electric field within the space, where each of the two pairs of rod electrodes face each other across the ion optical axis, where:

a cross-sectional shape of each of the four rod electrodes in a plane orthogonal to the ion optical axis is a half-rectangular shape in which corner portions at both ends of a first side which is a side facing the ion optical axis and is a portion of a tangent to a circle centered at the ion optical axis are each chamfered; and a ratio $c/r_0$ between a radius to of the circle and a dimension c of chamfering as well as a width w of the first side are determined so that an amount of dodecapole field component in the RE electric field created within the space is equal to or lower than a predetermined value or equal to a specific value.

5. The ion analyzer according to claim 1, wherein the ion optical element is a quadrupole ion guide.

6. The ion analyzer according to claim 5, wherein the ion analyzer has a configuration of a multi-stage differential pumping system including one or more intermediate vacuum chambers located between an ionization chamber containing an atmospheric pressure ion source and an analysis chamber containing a mass separator, with the ion optical element contained in an intermediate vacuum chamber in a stage next to the ionization chamber or in a stage after next.

7. The ion analyzer according to claim 1, wherein the ion optical element is a quadrupole mass filter.

8. The ion analyzer according to claim 4, wherein the ion optical element is a quadrupole ion guide.

9. The ion analyzer according to claim 8, wherein the ion analyzer has a configuration of a multi-stage differential pumping system including one or more intermediate vacuum chambers located between an ionization chamber containing an atmospheric pressure ion source and an analysis chamber containing a mass separator, with the ion optical element contained in an intermediate vacuum chamber in a stage next to the ionization chamber or in a stage after next.

10. The ion analyzer according to claim 4, wherein the ion optical element is a quadrupole mass filter.

* * * * *